Nov. 20, 1951 — H. E. BLEHM — 2,575,405
DRAG HARROW HITCH
Filed April 22, 1949 — 2 SHEETS—SHEET 1

INVENTOR.
HERBERT E. BLEHM,
BY
McMorrow, Berman & Davidson
ATTORNEYS.

Nov. 20, 1951 H. E. BLEHM 2,575,405
DRAG HARROW HITCH
Filed April 22, 1949 2 SHEETS—SHEET 2
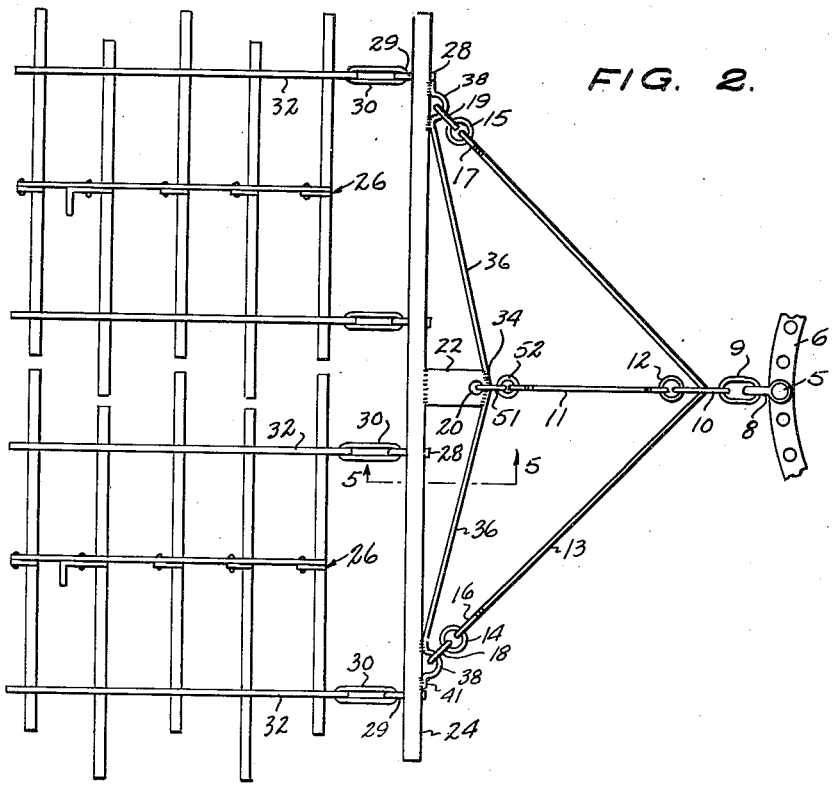
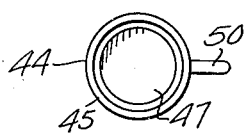
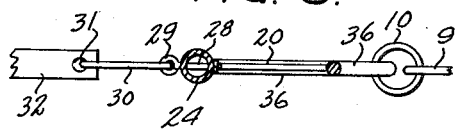
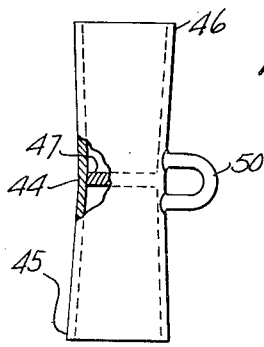
INVENTOR.
HERBERT E. BLEHM,
BY
McMorrow, Burman + Davidson
ATTORNEYS.

UNITED STATES PATENT OFFICE 2,575,405

DRAG HARROW HITCH

Herbert E. Blehm, Dorrance, Kans.

Application April 22, 1949, Serial No. 88,963

2 Claims. (Cl. 280—33.44)

This invention relates to hitches for harrows and the like by which to hitch drag harrows to a tractor or other draft means, and particularly to a resilient drag harrow hitch.

The main object of my invention is to provide means for hitching one or more drag harrows abreast behind a tractor or other draft means and successfully pulling the harrows over any type of ground traversed by the tractor.

Another object is to provide a hitch which may be made in sections individually connected to a pair or plurality of drag harrows and to the tractor or draft means, with special means interconnecting the adjacent ends of the hitch sections to allow flexing of the hitch means in accordance with the irregularities and inequalities of the ground.

A further object is to have a pair of hitch sections of tubular form and detachably interconnected by means of a double-ended flaring tube forming the connecting means and directly connected to the draft means in addition to the connection of the hitch sections thereto and allowing intermediate flexing of the hitch assembly without strain or undue wear on any of the parts.

It is also an object to have a special drag harrow hitch of the character indicated which is light, strong and sufficiently flexible to be virtually self-adjusting in use.

Other objects and advantages of the invention will appear in further detail as the specification proceeds.

In order to faciliate ready comprehension of this invention for a proper appreciation of the salient features thereof, the invention is illustrated on the accompanying drawings forming part hereof and in which:

Figure 2 is a plan view of a single drag harrow hitch directly connected to the rear portion of the tractor and having a pair of drag harrows connected thereto;

Figure 3 is an enlarged end elevation of the intermediate connecting member or double-ended flaring tube disposed between the two hitches in Figure 1;

Figure 4 is a plan view of the same connecting member or tube of Figure 3 with a portion in section to disclose internal construction;

Figure 5 is an enlarged fragmentary section taken on line 5—5 in Figure 2.

Throughout the views the same reference numerals indicate the same or like parts.

Figure 1:
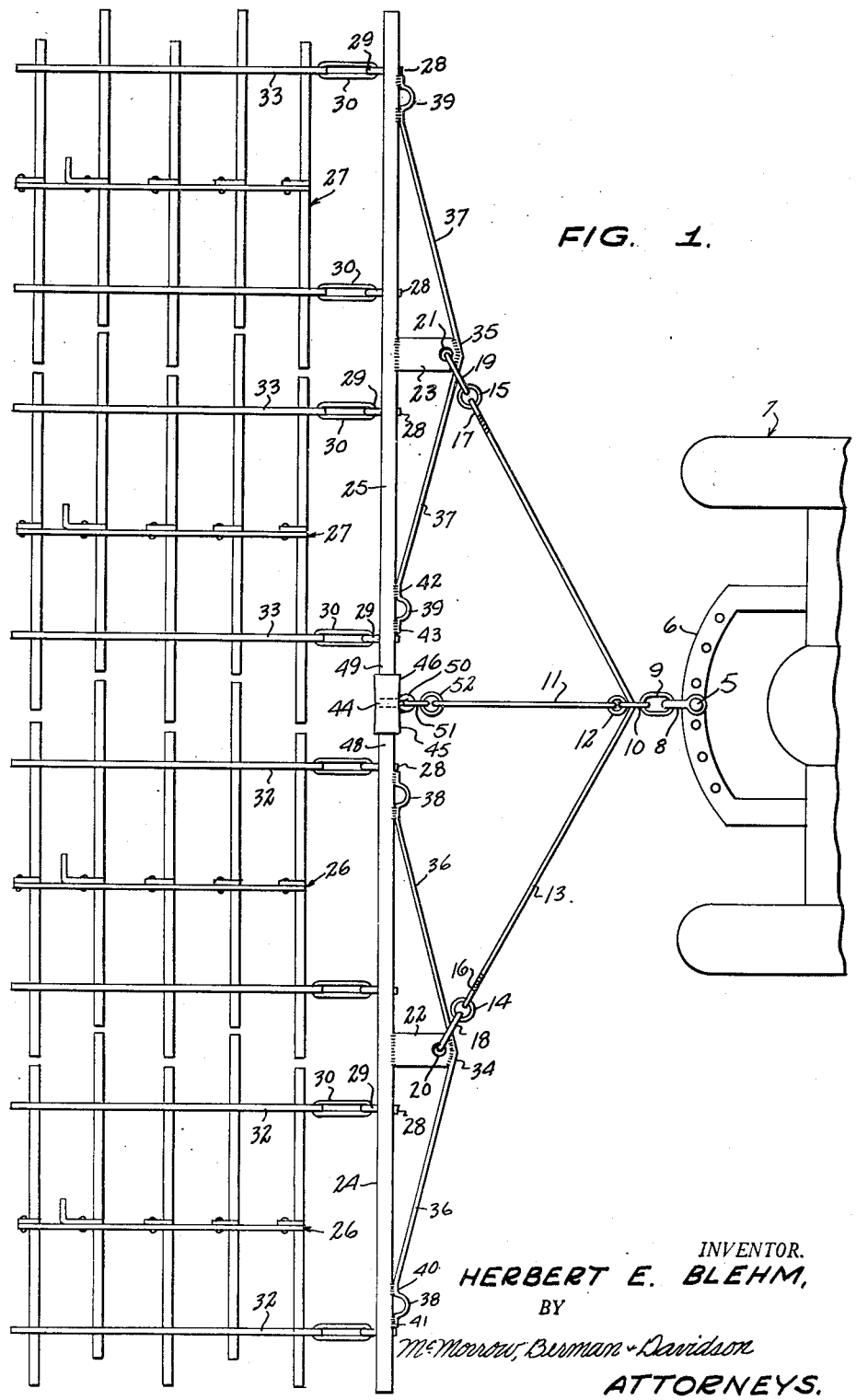
Figure 1 is a plan view of the resilient drag harrow hitch assembly connected to the rear end of a tractor or the like, and in turn connected to a group of drag harrows arranged abreast rearwardly of the hitches forming the assembly.

In harrows, particularly of the drag-harrow type, it is desirable to be in a position to cover a wide stretch of ground, and at the same time have reliable means for connecting a group of harrows to a tractor so that they may be drawn simultaneously over the ground to harrow it. However, it has been a problem to so connect the harrows together so that they would be effectively pulled by the tractor or other draft means without straining any parts, and also using a sufficient number of harrows effectively to save time and effort in the harrowing operation. Despite this desirable arrangement, nothing appears to have been adopted generally for thus connecting a large number of harrows to a tractor and simultaneously using them, and hence this situation still appears to remain a problem.

Upon considering this problem, it has occurred to me that a special hitch should be available for connecting a plurality of drag harrows thereto and itself so equipped that it may be attached at a plurality of points to the rear of a tractor, and also be equipped with means for connecting a plurality of such hitches behind the tractor for simultaneous operation. As a result, I have succeeded in producing a hitch of the outlined character, as will now be more fully described.

Hence, in the practice of my invention, and referring again to the drawings, in Figure 1, the rear end 6 of a tractor, generally indicated at 7, is provided with a rearwardly-extending ring or loop 8 bolted at 5 to the rear frame section 6 and to the loop 8 is connected a ring 9 with ring or loop 10 connected to the ring from a cable 11 provided with a smaller ring 12 from which the loop 10 extends and to which the cable 11 is connected at the forward end thereof and appropriately fastened. Through the loop 10 extends the intermediate portion of a cable 13 which at one end is secured to a ring 14 and at the other end is secured to a further ring 15, the ends 16 and 17 thus secured to rings 14 and 15 being appropriately looped and secured in such fashion as to be anchored to the mentioned rings. The rings 14 and 15 are in turn connected to a pair of chain links or loops 18 and 19 which extend through apertures 20 and 21 in a pair of forwardly-extending substantially flat lugs 22 and 23 welded or brazed to a pair of aligned metal pipes or tubes 24 and 25 which are substantially identical in form and size and which individually form drag-harrow hitches for a group of drag harrows, generally indicated at 26, 26, 27, 27.

Upon each of the two tubular hitch members 24 and 25, which may also be termed hitch bars, are mounted a group of eye bolts 28, 28, etc., with the eyes 29, 29 thereof extending rearwardly. The mentioned eyes or ring portions 29 of eye bolts 28 are individually connected to a series of loop or ring members 30, 30, etc., which at their rear ends engage in apertures 31 in the longitudinal side bars 32, 32, 33, 33 of the two groups of harrows thus connected to the two hitch bars 24 and 25. Thus, the harrows 26, 26, 27, 27 are disposed substantially abreast and by means of hitch bars 24 and 25 are connected to the rear end of drawbar frame 6 of tractor 7.

However, in order to reinforce the construction of the two tubular hitch members 24 and 25, they are provided with a pair of truss rods 34 and 35 which are brazed or welded to the forward ends of the previously-described lugs 22 and 23 with the side portions 36, 36, 37, 37 formed adjacent the ends thereof into forwardly-extending loops 38, 38 and 39, 39 and welded or brazed at each side of each loop, as for example at 40, 41, on each side of loop 38, and at 42, 43 on each side of each loop 39 to the respective hitch bars 24 and 25. The loops 38, 38, 39, 39 are thus available for connection by cable or chain to the tractor drawbar 6 in each case whenever desired, and in the present instance as described, the truss rods 34 and 35 reinforce the lugs 22 and 23, as well as the entire length of each of the hitch bars 24 and 25, so that they are sufficiently strong to form an adequate anchorage to which the harrows may be connected for drawing them across the ground.

In order further to reinforce the two hitch bars 24 and 25 when used together, a double-ended tubular member 44 having flaring ends 45 and 46 and with an internal partition 47, as best seen in Figures 3 and 4, is mounted upon the adjacent ends 48 and 49 in such fashion as to interconnect both bars 24 and 25 more or less flexibly and detachably, with the flaring ends 45 and 46 allowing flexing of the connection by the shifting of one bar out of line with respect to the other due to rough ground and irregularities found on pastures and fields over which the harrows are drawn. Upon the intermediate portion of the tubular connecting member 44 is welded a yoke 50 to which a pair of rings 51 and 52 are connected which in turn are connected to the rear end of the previously-mentioned cable 11 so that the connecting member 44 is thus directly connected to the tractor drawbar or frame 6, as well as the lugs 22 and 23 on the intermediate portions of hitch bars 24 and 25. It has previously been mentioned that loop 10 is connected to ring 12 on the one hand and ring 9 on the other hand, but this could also be a chain ring similar to ring 9 while cables 11 and 13 could well be chains, if so desired, the same merely illustrating one of several different means adapted for connecting the harrow hitch bars 24 and 25 to the tractor 7 when two bars are simultaneously used and interconnected by the double-ended connecting tube 44.

As shown in Figure 2, it is readily possible to use only one harrow hitch bar 24 for drawing the two harrows 26, 26, instead of four, as shown in Figure 1, wherein two bars are used. In this case, the cable 13 connected by links or rings 9 and 10 to the attachment yoke or loop 8 connected to the tractor drawbar 6 and connected by its rear ends 16 and 17 to the end loops 38, 38 of the truss rod 34 connected by means of rings or links 14 and 18 and 15 and 19 to the mentioned end loops 38, 38, while the cable 11 is connected at the rear end thereof through rings or links 51 and 52 to the center lug 22 on bar 24, the forward end being connected as already described to the tractor drawbar 6. The longitudinal side bars 32, 32 of harrows 26 are, of course, connected at the forward ends thereof by means of links or elongated rings 30 to the rearwardly-directed eyes 29 of eye bolts 28, as already described in connection with Figure 1.

From the foregoing, it is evident that one or two or even more hitch members may be used simultaneously and connected to the drawbar of a tractor, the arrangement of Figure 2 being used for a single hitch, but the method followed when connecting the hitches to the tractor as described in connection with Figure 1 being preferred when two or more hitches are used. In every case the hitch bar involved is so well reinforced and provided with connecting points, while itself being of light construction, that it is possible to draw two, four or more drag harrows behind a tractor and yet have these harrows adjust themselves according to the irregularities of the ground, due to the nature of the connections from the hitches to the tractor, and when more than one hitch is used, between the hitches as well.

Manifestly, variations may be resorted to and parts and features may be modified or used without others within the scope of the appended claims.

Having now fully described my invention, I claim:

1. A draw harrow assembly including a plurality of elongated and transversely-disposed tubular hitch bars arranged in mutual alignment, a double-ended, flaring, tubular connecting member mounted on each pair of adjacent ends of the hitch bars, a transverse partition fixed in the intermediate portion of the tubular connecting member, a hitching yoke secured externally to the intermediate portion of said tubular connecting member, a plurality of connecting members spaced apart and extending rearwardly upon each hitch bar and adapted for connection to one or more harrows, a hitching lug extending rigidly forwardly upon the intermediate portion of each hitch bar and having an aperture therein, a cable attached at one end to said hitching yoke and having a ring member attached to the other end thereof, a second cable extending through said ring member and attached at each of its ends to one of said hitching lugs, a truss rod secured at the intermediate portion thereof to the forward portion of each hitching lug forwardly of the respectively-associated hitch bar and extending at both sides of the hitching lug rearwardly to form two widely-spaced rod portions adjacent to the ends of the adjacent hitch bar, and a pair of hitching loops integral with the spaced rod portions upon each truss rod and secured at both ends of each loop to each respectively-adjacent hitch bar.

2. A drag harrow assembly comprising a pair of hitch bars arranged in end to end confronting spaced relation, a hollow connecting member arranged longitudinally of and between the confronting ends of said hitch bars and loosely and embracingly receiving the confronting ends of said hitch bars, a plurality of spaced connecting members extending rearwardly of each of said hitch bars and adapted for connection to one or more harrows, a hitching yoke arranged exteriorly of said connecting member and secured to the latter intermediate its ends, a hitching lug extending rigidly forwardly of each of said hitch bars intermediate the ends of the latter, a first cable having one end attached to said hitching yoke, a ring member on the other end of said cable for attachment to the rear end of a tractor, a second cable extending through said ring member and having one end secured to the adjacent one of said lugs and having the other end secured to the adjacent other of said lugs, and a truss rod arranged longitudinally and forwardly of each of said hitch bars and connected at its mid-portion to the forward portion of the adjacent lug with each of its ends connected to the adjacent hitch bar.

HERBERT E. BLEHM.

REFERENCES CITED

The following references are of record in the file of this patent:

UNITED STATES PATENTS

| Number | Name | Date |
| --- | --- | --- |
| 1,379,518 | Berger | May 24, 1921 |
| 1,428,360 | Clevenger | Sept. 5, 1922 |
| 2,096,864 | Strunk | Oct. 26, 1937 |